United States Patent
Kang

(10) Patent No.: US 9,123,991 B2
(45) Date of Patent: Sep. 1, 2015

(54) EAR-MICROPHONE HAVING ESD ENHANCING FUNCTION

(75) Inventor: Tae-Jin Kang, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 838 days.

(21) Appl. No.: 13/035,099

(22) Filed: Feb. 25, 2011

(65) Prior Publication Data

US 2011/0216911 A1    Sep. 8, 2011

(30) Foreign Application Priority Data

Mar. 2, 2010 (KR) .................. 10-2010-0018584

(51) Int. Cl.
| | |
|---|---|
| H04R 1/10 | (2006.01) |
| H01Q 1/27 | (2006.01) |
| H01Q 1/24 | (2006.01) |
| H01Q 1/46 | (2006.01) |
| H01Q 1/50 | (2006.01) |
| H04M 1/60 | (2006.01) |
| H04M 1/725 | (2006.01) |

(52) U.S. Cl.
CPC .............. *H01Q 1/273* (2013.01); *H01Q 1/241* (2013.01); *H01Q 1/46* (2013.01); *H01Q 1/50* (2013.01); *H04M 1/6058* (2013.01); *H04M 1/72522* (2013.01)

(58) Field of Classification Search
CPC .............. H04R 1/04; H04R 1/06; H04R 1/10; H04R 1/1033; H04R 1/1041; H04R 1/1091; H04R 1/22; H04R 3/007; H04R 5/033; H04R 5/04; H04R 25/02; H04R 25/04; H04R 25/55; H04R 25/552; H04R 25/556; H04R 25/558; H04R 2201/10; H04R 2201/103; H04R 2201/105; H04R 2201/107; H04R 2201/109; H04R 2205/022; H04R 2209/043; H04R 2225/49; H04R 2225/51; H04R 2225/61; H04R 2420/03; H04R 2420/09; H04R 2460/01
USPC .............. 381/122, 118, 124, 98, 95, 96, 94.6, 381/94.5, 94.1, 92, 93, 332, 74, 73.1, 72, 381/71.1, 314, 312, 55, 26, 309, 303, 1, 3, 381/7, 8, 9, 13, 384, 393, 394, 189; 700/94; 455/575.2, 3.06, 295, 296, 300, 305, 455/306, 307, 308, 319, 330; 439/578
See application file for complete search history.

(56) References Cited

U.S. PATENT DOCUMENTS

| | | | |
|---|---|---|---|
| 7,002,220 B1 * | 2/2006 | Jin et al. .................. 257/358 |
| 2005/0245289 A1 * | 11/2005 | Yoshino .................... 455/569.1 |
| 2006/0028383 A1 * | 2/2006 | Yoshino .................... 343/718 |
| 2007/0032130 A1 * | 2/2007 | Yoshino .................... 439/578 |
| 2008/0242378 A1 | 10/2008 | Lowles et al. |

FOREIGN PATENT DOCUMENTS

| | | |
|---|---|---|
| EP | 1 624 586 A1 | 2/2006 |
| EP | 1 971 179 A1 | 9/2008 |

* cited by examiner

*Primary Examiner* — Leshui Zhang
(74) *Attorney, Agent, or Firm* — Jefferson IP Law, LLP

(57) ABSTRACT

An ear-microphone for connection to a portable apparatus and use as a Frequency Modulation (FM) radio broadcast receiving antenna is provided. The ear-microphone includes an ear plug, a cable, a microphone, and a filtering unit. The ear plug is for connection to an earjack. The cable has a predefined length, has an earphone line whose one end is electrically connected to the ear plug and whose other end is electrically connected to at least one earphone. The microphone intervenes in an intermediate portion of the cable and is connected to the ear plug via a microphone line inside the cable. The filtering unit intervenes in the cable and is installed to have an Electro Static Discharge (ESD) protection function.

7 Claims, 2 Drawing Sheets

EAR-MICROPHONE HAVING ESD ENHANCING FUNCTION

PRIORITY

This application claims the benefit under 35 U.S.C. §119(a) of a Korean patent application filed in the Korean Intellectual Property Office on Mar. 2, 2010 and assigned Serial No. 10-2010-0018584, the entire disclosure of which is hereby incorporated by reference.

BACKGROUND OF THE INVENTION

1. Field of the Invention

The present invention relates to an ear-microphone. More particularly, the present invention relates to an ear-microphone having an Electro Static Discharge (ESD) enhancing function.

2. Description of the Related Art

Recently, as a multimedia technology develops, portable electronic apparatuses having various functions are emerging. Examples of these apparatuses include a mobile terminal, a Motion Picture Expert Group Audio Layer-3 (MP3) player, a Portable Multimedia Player (PMP), and the like. These apparatuses have a convergence function that performs one or more functions in a combination.

In case of a mobile terminal, the mobile terminal can receive sky wave broadcasting (for example, ground wave Digital Multimedia Broadcasting (DMB)) or Frequency Modulation (FM) radio broadcasting, and reproduce a music file, or capture and reproduce a high quality moving image besides a basic communication function.

When performing these various additional functions, a user additionally uses an ear-microphone including an ear plug inserted into an earjack of a relevant apparatus. In a further case of a mobile terminal, an ear plug is provided to one end of a cable of a predefined length, and a pair of earphones is installed to the other end. In addition, a microphone is installed on the cable, so that a hands-free function is performed during communication.

The above-described plug uses a four-pole terminal, and each terminal is electrically insulated and installed. When the plug is inserted into the earjack, each terminal contacts a relevant pin installed at a relevant position of the earjack, so that each terminal performs a relevant function.

While a portable apparatus receives an FM radio broadcast, the above-described ear-microphone uses an earphone line and/or a microphone line of the ear-microphone as an antenna, without having an antenna unit inside the ear-microphone.

In this case, the ear-microphone additionally mounts therein a predefined protection device for protecting against an Electro Static Discharge (ESD) of the FM radio antenna. Since a standard of a relevant line does not exist, each apparatus analyzes FM radio performance and a trade-off of ESD protection to perform separate tuning, which is difficult.

In addition, as the number of additional functions gradually increases, such that the number of corresponding components also increases, it becomes difficult to ensure a space for installing a separate ESD device for an FM radio antenna inside an apparatus while maintaining a light weight and a slim profile.

Therefore, a need exists for an ear-microphone having an ESD enhancing function, realized to contribute to a slim profile and reliability improvement of a portable apparatus by not adding a separate device inside the portable apparatus.

SUMMARY OF THE INVENTION

An aspect of the present invention is to address at least the above-mentioned problems and/or disadvantages and to provide at least the advantages described below. Accordingly, an aspect of the present invention is to provide an ear-microphone having an Electro Static Discharge (ESD) enhancing function, realized to contribute to a slim profile and reliability improvement of a portable apparatus by not adding a separate device inside the portable apparatus.

Another aspect of the present invention is to provide an ear-microphone having an ESD enhancing function, realized to improve ESD while having no influence on Frequency Modulation (FM) radiation without installing a separate additional device to an apparatus.

Still another aspect of the present invention is to provide an ear-microphone having an ESD enhancing function, realized to improve ESD while having no influence on FM radiation by adopting a simple filter to a relevant line.

In accordance with an aspect of the present invention, an ear-microphone connected to a portable apparatus and used as an FM radio broadcast receiving antenna is provided. The ear-microphone includes an ear plug received in an earjack of the portable apparatus, a cable of a predefined length, having an earphone line whose one end is electrically connected to the ear plug and whose other end is electrically connected to at least one earphone, a microphone intervening in an intermediate portion of the cable and connected to the ear plug via a microphone line inside the cable, and a filtering unit intervening in the earphone line and/or the microphone line and installed to have an ESD improving function.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, like reference numerals will be understood to refer to like parts, components and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Though a mobile terminal and an ear-microphone applied thereto are illustrated, exemplary embodiments of the present invention are applicable to any portable apparatus that can perform a Frequency Modulation (FM) function and to which a microphone of the present invention is applied.

Figure 1:
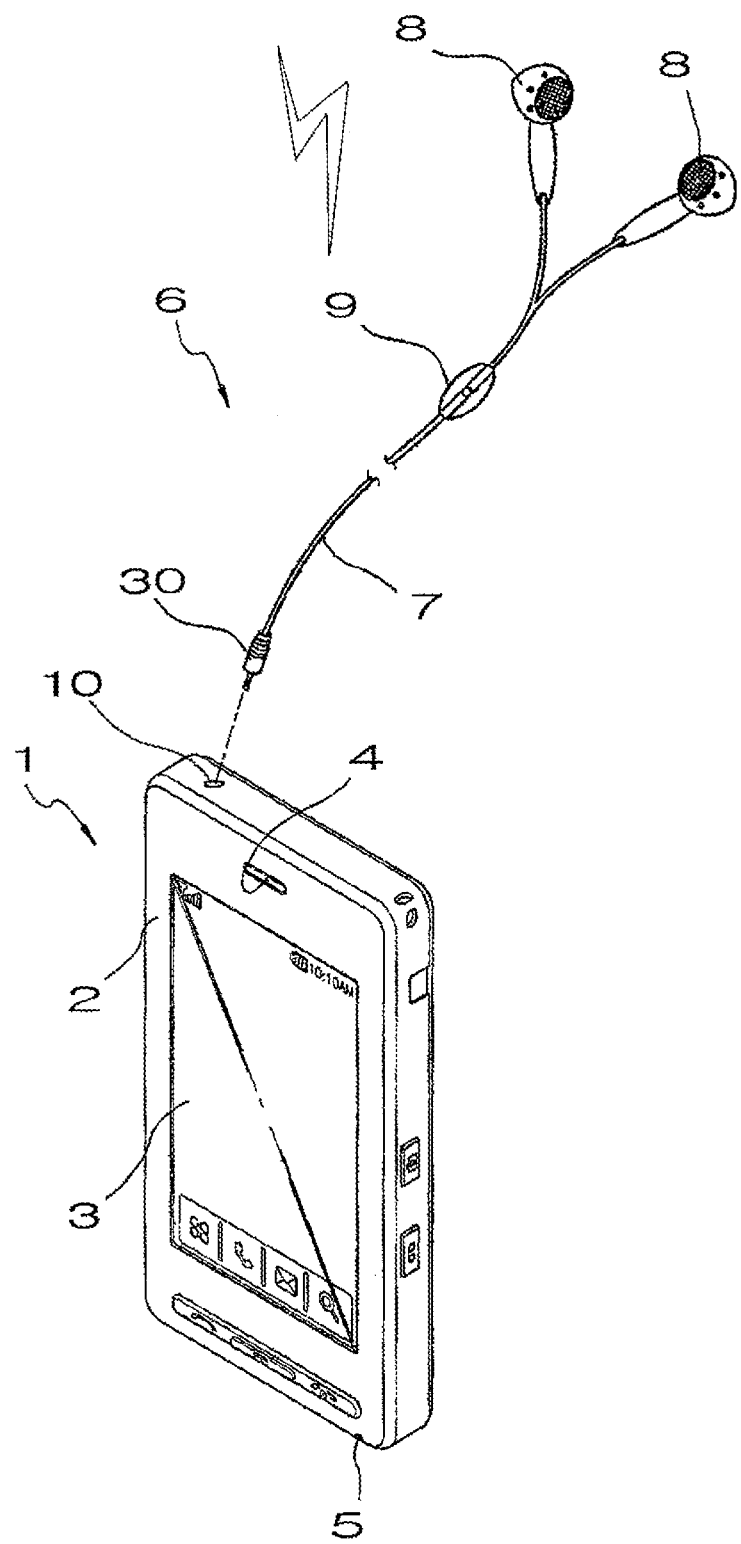
FIG. 1 is a perspective view illustrating an ear-microphone according to an exemplary embodiment of the present invention.
Figure 2:
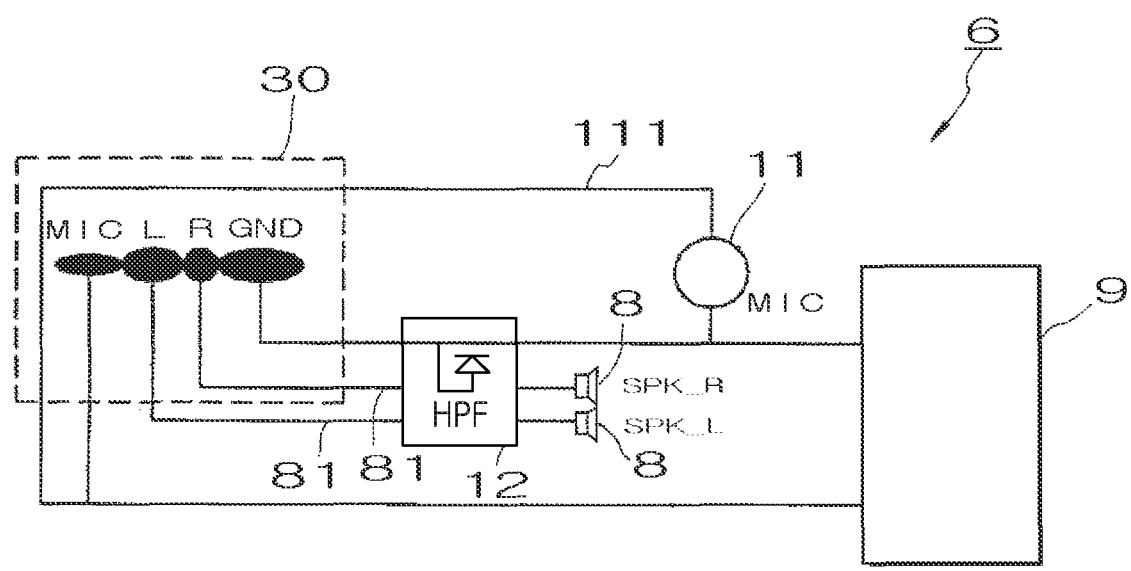
FIG. 2 is a view illustrating a construction of an ear-microphone according to an exemplary embodiment of the present invention.

FIGS. 1 and 2, discussed below, and the various exemplary embodiments used to describe the principles of the present disclosure in this patent document are by way of illustration only and should not be construed in any way that would limit the scope of the disclosure. Those skilled in the art will understand that the principles of the present disclosure may be implemented in any suitably arranged communications system. The terms used to describe various embodiments are exemplary. It should be understood that these are provided to merely aid the understanding of the description, and that their use and definitions in no way limit the scope of the invention. Terms first, second, and the like are used to differentiate between objects having the same terminology and are in no way intended to represent a chronological order, unless where explicitly state otherwise. A set is defined as a non-empty set including at least one element.

FIG. 1 is a perspective view illustrating an ear-microphone according to an exemplary embodiment of the present invention.

Referring to FIG. 1, an ear-microphone 6 includes a cable 7 of a predefined length, an ear plug 30 connected to one end of the cable 7, and a pair of earphones 8 that branch from the other end of the cable 7. In addition, a microphone 9 including a button for performing various functions, such as establishing a communication connection, terminating a communication connection, etc., intervenes on the cable 7.

Additionally, in the mobile terminal 1, a display unit 3 is installed on the front side of a body 2, a speaker 4 is installed in the upper portion of the mobile terminal 1, and a microphone 5 is installed in the lower portion of the mobile terminal 1. In addition, an earjack 10 is installed in the upper side of the body 2 to receive the ear plug 30 of the ear-microphone 6.

The ear-microphone 6 is applicable not only when a user uses a hands-free function for communication but also when a user listens to music through a music file, and receives and listens to sky wave broadcasting using the display unit.

The mobile terminal 1 has an FM radio reception function. However, the mobile terminal 1 does not have an FM radio receiving antenna unit therein, and may use an earphone line and/or a microphone line through the ear plug 30 received in the earjack 10 as an antenna. Therefore, the length of the cable 7 and the location of the microphone 9 are designed with consideration of a case where the ear-microphone 6 is used as the FM signal receiving antenna.

According to an exemplary embodiment of the present invention, a device for protecting against an Electro Static Discharge (ESD) of an FM radio antenna is not applied to the mobile terminal. Such a protection device is applied inside the ear-microphone. Instead, such configuration excludes a separate additional device in the mobile terminal, thereby contributing to a slim profile of the mobile terminal.

FIG. 2 is a view illustrating a construction of an ear-microphone according to an exemplary embodiment of the present invention.

Though the ear-microphone is exemplarily described using a four-pole terminal, exemplary embodiments of the present invention are applicable to a three-pole or five-pole terminal.

Referring to FIG. 2, respective terminals of the ear plug 30 are connected to relevant units via a corresponding predefined line. For example, a microphone (MIC) terminal of the ear plug 30 is electrically connected with a MIC unit 11 via a MIC line 111. Speaker terminals SPK_L and SPK_R are electrically connected with an earphone 8 via predefined speaker lines 81. Of course, the MIC line 111 and a ground line by-pass the earphone 8 but are connected to the microphone 9, so that they perform a relevant function according to a signal of a relevant button.

A High Pass Filter (HPF) 12 intervenes on the earphone line 81. The HPF 12 may be an inductor-capacitor (LC) filter. Besides the LC filter, an ESD protecting diode may be applied. In this case, the ESD protecting diode should have a capacitance value that does not influence an FM radio frequency band.

Though the above-described filters have been applied to the earphone line 81, the filters may also be applied to the MIC line 111. Therefore, since an external ESD event is filtered by the filter unit of the ear-microphone, the ear-microphone may continue to safely operate without adversely impacting the radiation characteristic of an FM radio antenna.

An ear-microphone according to an exemplary embodiment of the present invention provides an effect of improving ESD protection while having substantially no influence on FM radiation without adding a separate device to a connected relevant apparatus.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. An ear-microphone for connection to a portable apparatus and use as a Frequency Modulation (FM) radio broadcast receiving antenna, the ear-microphone comprising:

an ear plug for connection to an earjack;

a cable of a predefined length, having an earphone line with two ends, wherein one end of the earphone line is electrically connected to the ear plug and another end of the earphone line is electrically connected to at least one earphone;

a microphone intervening in an intermediate portion of the cable and connected to the ear plug via a microphone line inside the cable; and a filtering unit intervening in the earphone line and installed to have an Electro Static Discharge (ESD) protection function, wherein the earphone line forms an FM antenna when the ear-microphone is connected to the portable apparatus and the filtering unit is installed on the earphone line which forms the FM antenna, and wherein the filtering unit comprises an ESD protecting diode that performs the Electro Static Discharge (ESD) protection function.

2. The ear-microphone of claim 1, wherein the filtering unit comprises a High Pass Filter (HPF) that uses at least one of an inductor and a capacitor.

3. The ear-microphone of claim 2, wherein the ESD protecting diode has a capacitance that does not influence an FM signal band.

4. An ear-microphone for connection to a portable apparatus and use as a Frequency Modulation (FM) radio broadcast receiving antenna, the ear-microphone comprising:

an ear plug for connection to an earjack;

a cable having an earphone line with two ends, wherein one end of the earphone line is electrically connected to the ear plug and another end of the earphone line is electrically connected to at least one earphone; and a filtering unit intervening in the earphone line and installed to have an Electro Static Discharge (ESD) protection function, wherein the earphone line forms an FM antenna when the ear-microphone is connected to the portable apparatus and the filtering unit is installed on the earphone line which forms the FM antenna, and wherein the filtering unit comprises an ESD protecting diode that performs the Electro Static Discharge (ESD) protection function.

5. The ear-microphone of claim 4, further comprising a microphone intervening in an intermediate portion of the cable and connected to the ear plug via a microphone line inside the cable.

6. The ear-microphone of claim 5, wherein the filtering unit comprises a High Pass Filter (HPF) that uses at least one of an inductor and a capacitor.

7. The ear-microphone of claim 6, wherein the ESD protecting diode has capacitance that does not influence an FM signal band.

* * * * *